United States Patent [19]
Takanashi

[11] Patent Number: 5,901,892
[45] Date of Patent: May 11, 1999

[54] FILM TRANSPORTING APPARATUS

[75] Inventor: Teruo Takanashi, Kanagawa, Japan

[73] Assignee: Fuji Photo Film Co., Ltd., Kanagawa, Japan

[21] Appl. No.: 08/988,135

[22] Filed: Dec. 10, 1997

[30] Foreign Application Priority Data

Dec. 12, 1996 [JP] Japan .................................. 8-331987

[51] Int. Cl.⁶ ........................... B65H 23/04; B65H 23/00; G03B 27/62
[52] U.S. Cl. .................................... 226/27; 226/2; 355/75
[58] Field of Search .................................. 226/2, 27, 32, 226/43; 355/41, 75; 250/559.02

[56] References Cited

U.S. PATENT DOCUMENTS

| | | | |
|---|---|---|---|
| 4,806,990 | 2/1989 | Tahara | 355/41 X |
| 4,807,790 | 2/1989 | Ushioda et al. | 226/2 |
| 4,947,205 | 8/1990 | Benker et al. | 355/41 |
| 4,994,850 | 2/1991 | Imamura et al. | 355/75 X |
| 5,214,468 | 5/1993 | Seto | 355/41 |
| 5,260,740 | 11/1993 | Seto | 355/41 |
| 5,550,613 | 8/1996 | Hasegawa et al. | 355/75 X |
| 5,729,329 | 3/1998 | Ajimu et al. | 355/41 X |

*Primary Examiner*—Michael Mansen
*Attorney, Agent, or Firm*—Sughrue, Mion, Zinn Macpeak & Seas, PLLC

[57] ABSTRACT

A film transporting apparatus for transporting forwards and backwards a film with a plurality of images recorded thereon in a predetermined direction, whereby the position of each image is stored and placed in a predetermined position on the basis of the position of multiplicity of position differentiating marks provided on the film in the predetermined direction at regular pitches, the predetermined direction at regular pitches, including, a mark detecting device for detecting the marks on the film, an image detecting device for detecting the images on the film, a rear edge detecting device for detecting the rear edge of the film, and a control device for controlling the mark detecting device so as not to detect marks from the rear edge of the film to a reference portion on the film.

21 Claims, 8 Drawing Sheets

FILM TRANSPORTING APPARATUS

BACKGROUND OF THE INVENTION

1. Field of the Invention

This invention relates to a film transporting apparatus, and is particularly concerned with a film transporting apparatus for transporting a film with a plurality of images recorded thereon in a predetermined direction and for positioning the film in a predetermined position.

2. Description of the Related Art

Well known hitherto is a photoprinter for printing out film images on photographic printing paper by irradiating images recorded on a negative film with exposing light and irradiating the light passing through the film images onto photographic printing paper. The photoprinter is provided with a film carrier as a device for carrying films, the negative film with the images to be printed out recorded thereon being set in the film carrier.

This type of photoprinter operates by transporting the negative film placed in the film carrier forwards and backwards. The exposure conditions of each image of the negative film are established and recorded during the forward transportation, along with the position of each image on the film against the marker of the film perforations. On the backward transportation each image is placed in sequence according to exposure position based on the recorded exposure conditions and position of each image recorded during the forward transportation, and is then printed onto photographic printing paper.

With this type of photoprinter, it is necessary that the perforations detected during the forward transportation and the perforations detected during the backward transportation on the film carrier be matched with each other. Hitherto, the last perforation detected during the forward transportation has been regarded as matching the first perforation detected during the backward transportation. Using the first perforation detected during the backward transportation as a reference, the perforation locations during the forward transportation have been matched to the perforation locations during the backward transportation.

However, as is shown in FIGS. 8A and 8B, depending on where the rear edge of the negative film N is cut, the perforation 110 may either not connect with the edge of the negative film M1 (FIG. 8A), or may connect with the edge of the negative film M1 (as in FIG. 8B). Consequently, in the conventional film transporting apparatus, even though the perforation 110 at the rear edge of the negative film may have been detected during the forward transportation, depending on factors such as whether or not the perforation 110 is picked up by the perforation detection sensors, the perforation 110 might not be detected during the backward transportation. In such cases, the problem of being unable to accurately place each images exposure position during the backward transportation arises because the perforations during forward and backward transportation were not able to be matched.

SUMMARY OF THE INVENTION

This present invention was made in order to solve the above-mentioned problem, with the object of providing a film transporting apparatus whereby images recorded on a film can be placed with certainty in a predetermined position notwithstanding the condition of a mark at the rear edge of the film.

The film transporting apparatus of the present invention is an apparatus whereby a film with a plurality of images recorded thereon is transported forwards and backwards in a predetermined direction, the position of each image is detected using a means of image detection during the forward transportation, and at the same time, along the predetermined direction, a series or multiple position differentiating marks prepared on the surface of the film at a set rate is detected, using a means of mark detection. The position of each image is recorded on the basis of the position of a specific mark, and during the backward transportation, the series of marks is detected. Based on the marks thus detected and the position of each image based on the recorded specific mark position, each image is placed in a predetermined position. A rear edge detection means is provided for detecting the film rear edge, as well as a control means for controlling the mark detection means, so as to begin mark detection from the film reference point on the backward journey, based on the film rear edge detection results using the rear edge detection means, and not to carry out mark detection from the reference point of the film to the rear edge on the forward journey.

According to the film transporting apparatus of the present invention, the position of each image recorded on the film is detected by the image detecting means during the forward transportation and at the same time, the position differentiating marks are detected in succession by the mark detecting means, the position of each image is recorded on the basis of a specific mark position, the marks are detected in succession during the backward transportation, and each image is placed in a predetermined position according to the detected marks and the position of each image based on the specific mark position recorded during the forward transportation. Further, the mark detecting means is controlled by the control means so as not to detect the marks during the forward transportation from the reference point on the film to the rear edge based on the film rear edge detection result using the rear edge detecting means, but to start detection of the marks from the reference point on the film during the backward transportation.

As described above, the marks are not detected from the reference point on the film to the rear edge during the forward transportation, instead detection of the marks is started from the reference point on the film during the backward transportation. Therefore those marks which are detected during the forward transportation and those detected during the backward transportation can be matched with certainty, irrespective of the shape of marks at the rear edge of the film, thus images recorded on the film can be placed with certainty in predetermined positions.

DESCRIPTION OF THE PREFERRED EMBODIMENT

A mode of operation of the present invention will now be described in detail with reference to the drawings.

Figure 1:
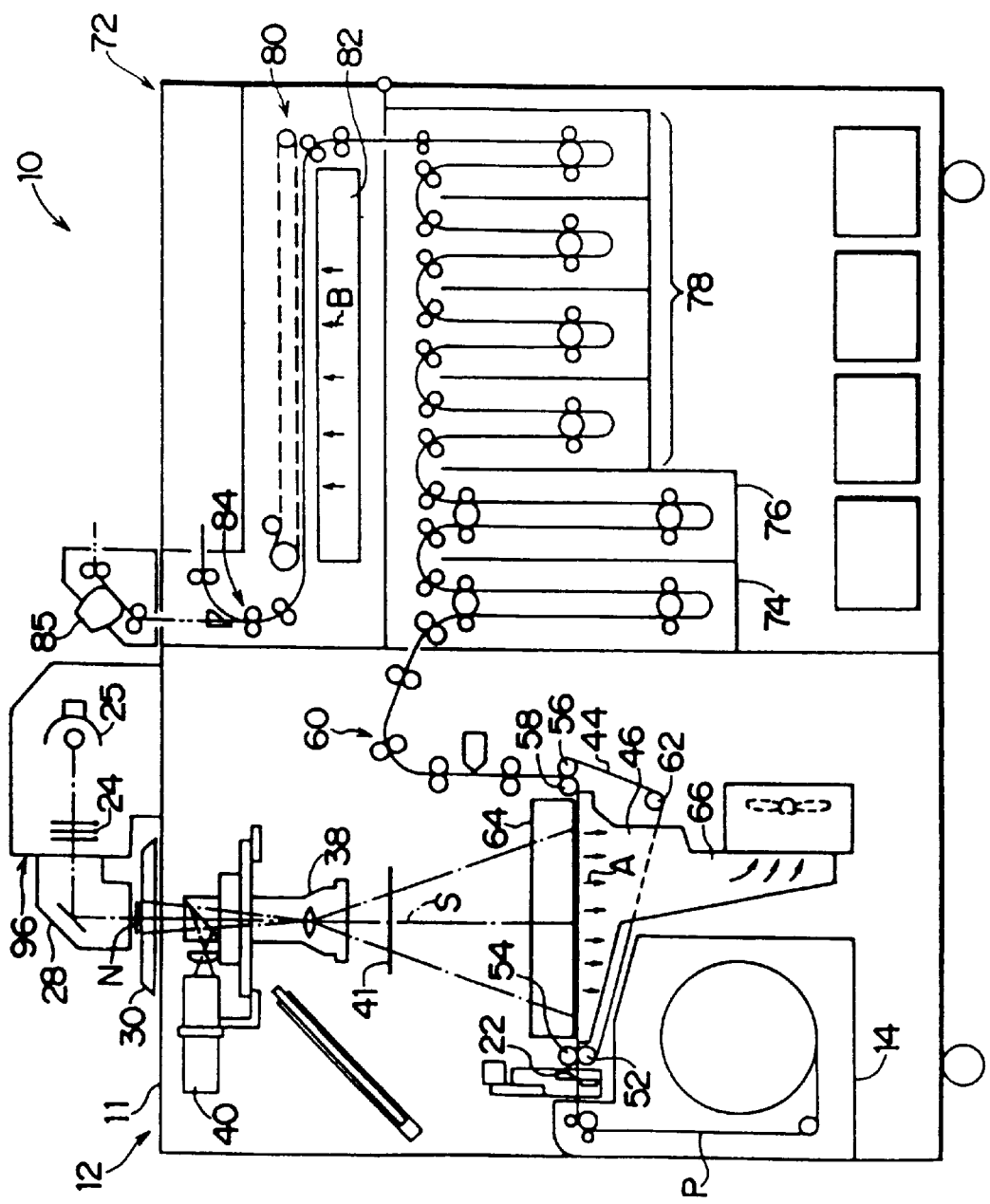
FIG. 1 is a schematic block diagram of a printer processor relating to the mode of operation of the present invention.
Figure 2:
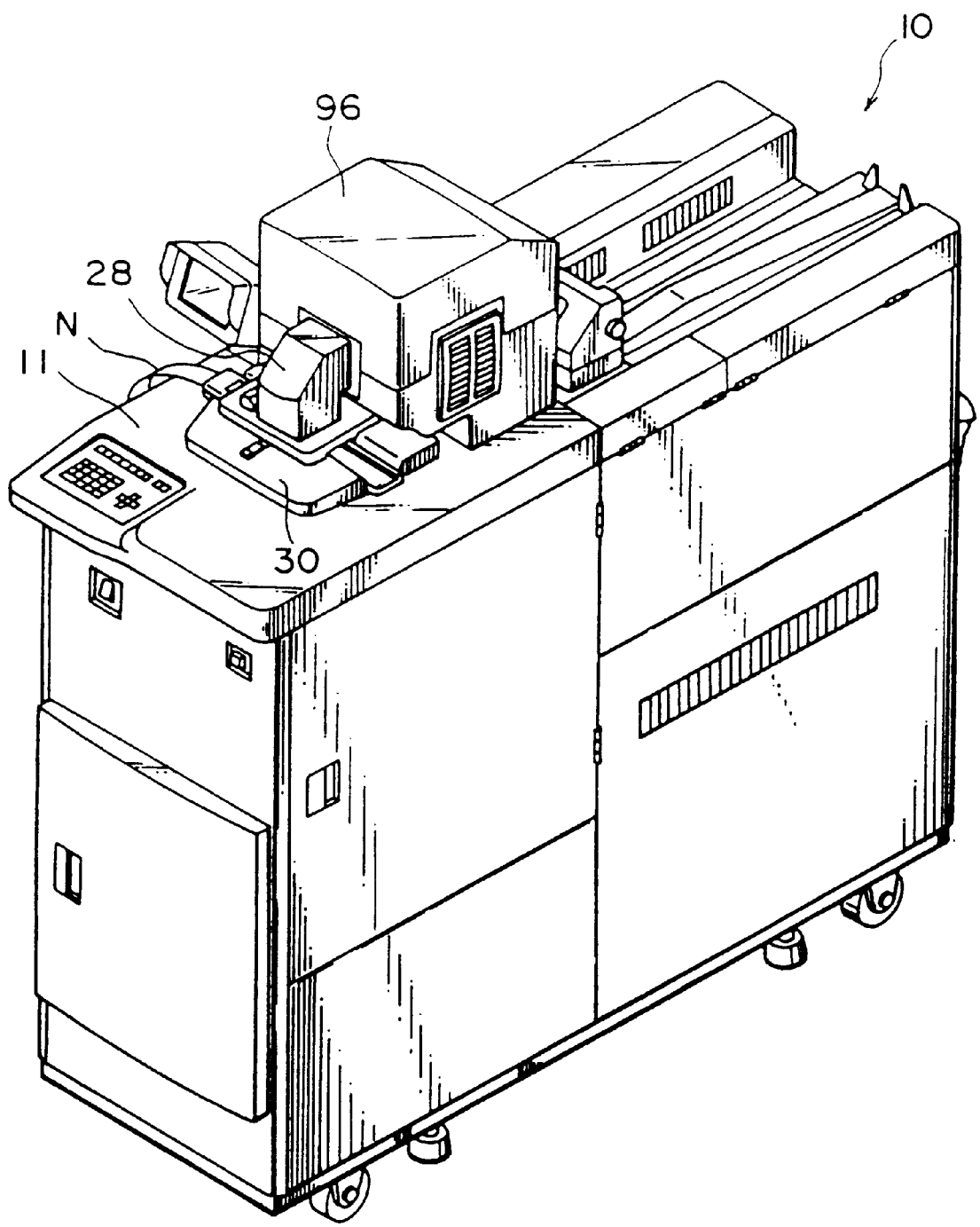
FIG. 2 is a perspective view of the printer processor relating to the mode of operation of the present invention.

A schematic construction of a printer processor 10 relating to the mode of operation is shown in FIG. 1 and FIG. 2. The printer processor 10 is provided with a photoprinting unit 12. The arrangement is such that a paper magazine 14 enclosing photographic printing paper P therein is loaded into the photoprinting unit 12. A cutter 22 is mounted on a passage of the photographic printing paper P drawn out of the paper magazine 14, and a pedestal 46 is further mounted on the downstream side thereof. A wrapping roller 52 on which an endless belt 44 is wound is mounted between the pedestal 46 and the cutter 22. Further, a nip roller 54, for holding the endless belt 44 between itself and the wrapping roller 52, is mounted on the upper side of the wrapping roller 52.

A guide roller 56 on which the endless belt 44 is wound is positioned on the downstream side of the pedestal 46 in the direction in which the photographic printing paper is transported. A retainer roller 58 is mounded adjacently to the guide roller 56 so that its bottom side is almost exactly at the same height as the top side of the wrapping roller 52, thus the endless belt 44 has its outer perimeter pushed by the retainer roller 58. Further, the endless belt 44 is wound on a tension roller 62 on the lower side of the guide roller 56, and is rotated clockwise in FIG. 1 by having a driving force of a motor (not indicated) transferred thereto.

An easel device 64 is provided on the upper portion of the endless belt 44 which moves along above the pedestal 46, and when printing an image having a border on the photographic printing paper P, a moving piece within the easel device 64, which is not indicated, moves to cover the outer edge of the photographic printing paper P.

As shown in FIG. 2, a working table 11 is formed on an upper portion of the photoprinting unit 12, and a light source device 96 is mounted on its inner side (the right side in FIG. 1). A light controlling filter unit 24 having an exposure lamp 25 and a plurality of light controlling filters is provided in the light source device 96, and further mounted adjacent to the light source device 96 is a diffusion box 28 for diffusing the exposing light radiated from the exposing lamp 25 and then transmitted through the light controlling filter unit 24, and then bending the exposing optical axis vertically to approximately 90° to the working table 11. The exposing light bent as above passes through a negative carrier 30 operating as the film transportation apparatus of the present invention which is set up on the top of the working table 11.

Moreover, in the negative carrier 30, the position where the exposing light passes through is called the exposure position. For stabilization of the lamp illuminance and other purposes the exposing lamp 25 is lighted all the time when the power supply of the printer processor 10 is on. If a negative film N is placed in the exposure position, then the light radiated from the exposing lamp 25 and transmitted through the light controlling filter unit 24 may be irradiated duly to the negative film N.

Further, a density measuring apparatus 40 for measuring the density of the negative film N is mounted within the photoprinting unit 12. Based on the data measured, the amount of correction of the exposure conditions at the time of printing exposure is computed. A zoom lens 38 is mounted on the lower part of the density measuring apparatus 40, and a black shutter 41 is mounted on the optical path between the zoom lens 38 and the easel device 64.

In the above-described construction, the arrangement is such that at the photoprinting unit 12 the photographic printing paper P, delivered from the paper magazine 14, is cut on the cutter 22 into a predetermined length, positioned to the pedestal 46 on an optical axis S of the light, and the images recorded on the negative film N are printed. The photographic printing paper P having the images printed thereon is transported to a processor unit 72 for carrying out the processes of color development, bleach fixing, washing and drying by passing through a passage 60 constructed of multiple pairs of rollers.

A color developing tank 74, a bleach fixing tank 76 and a washing tank 78 are provided in the processor unit 72, and developing solution, bleach fixing solution and washing water are stored therein respectively. The photographic printing paper P is transported in a U-shaped flow through each tank, in the process being dipped in the solutions stored in each tank, and thereby being treated for color development, bleach fixing and washing. The washed photographic printing paper P is transported to a dryer unit 80, and is dried by having dry air coming from chamber 82 blown there against.

On the downstream side in relation to the dryer unit 80 according to the direction of transportation of photographic printing paper P is mounted a passage 84 constructed of multiple pairs of rollers. The photographic printing paper P, after being dried and discharged from the dryer unit 80, is run between these rollers and then discharged externally of the printer processor 10. For setting and controlling the exposure conditions, the photographic printing paper P after being dried at the dryer unit 80 is transported towards a densitometer 85 mounted over the drier unit 80, and the image density printed on the photographic printing paper P is measured by the densitometer 85.

Figure 3:
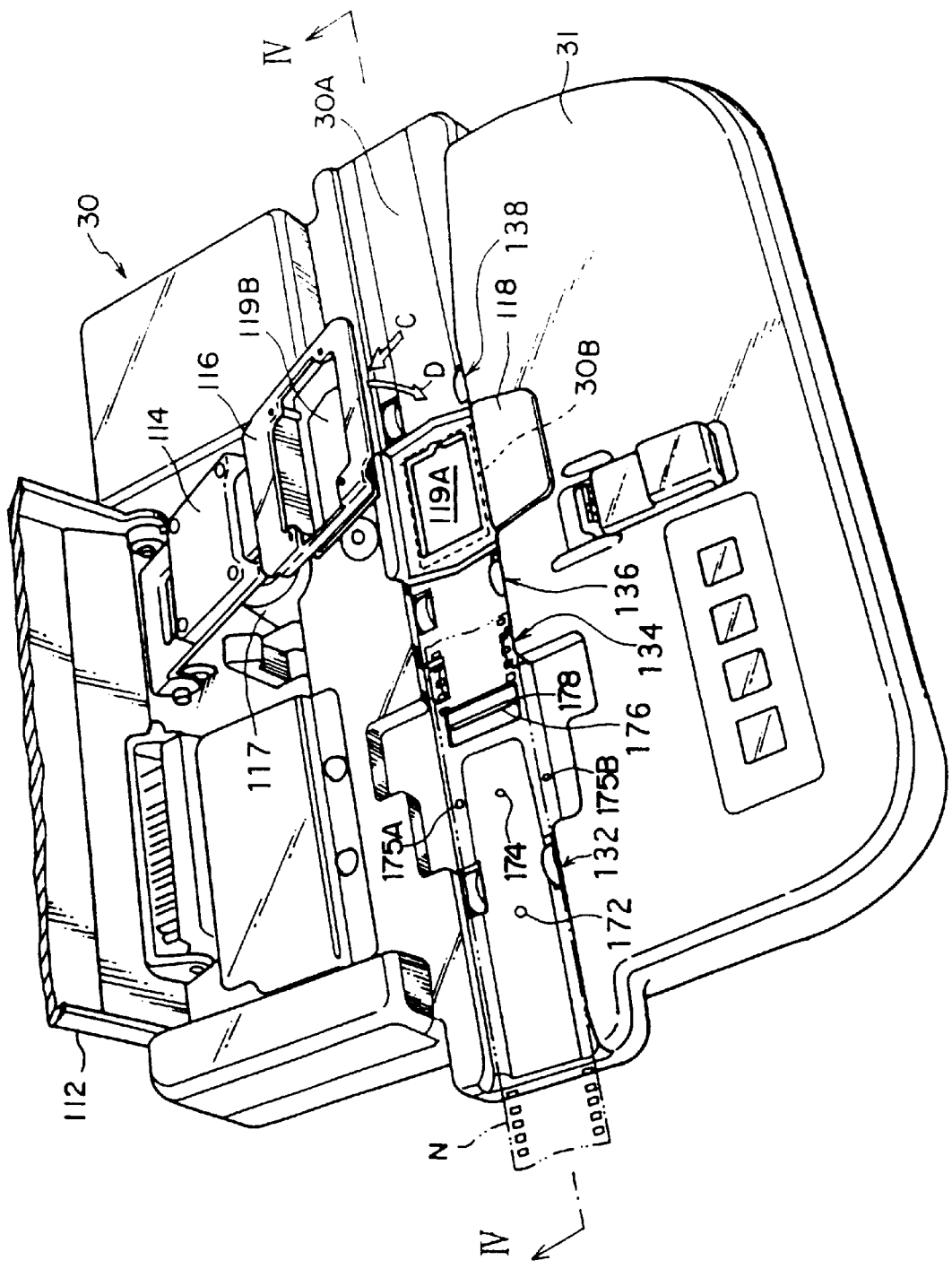
FIG. 3 is a perspective view of a negative carrier relating to the mode of operation of the present invention.
Figure 4:
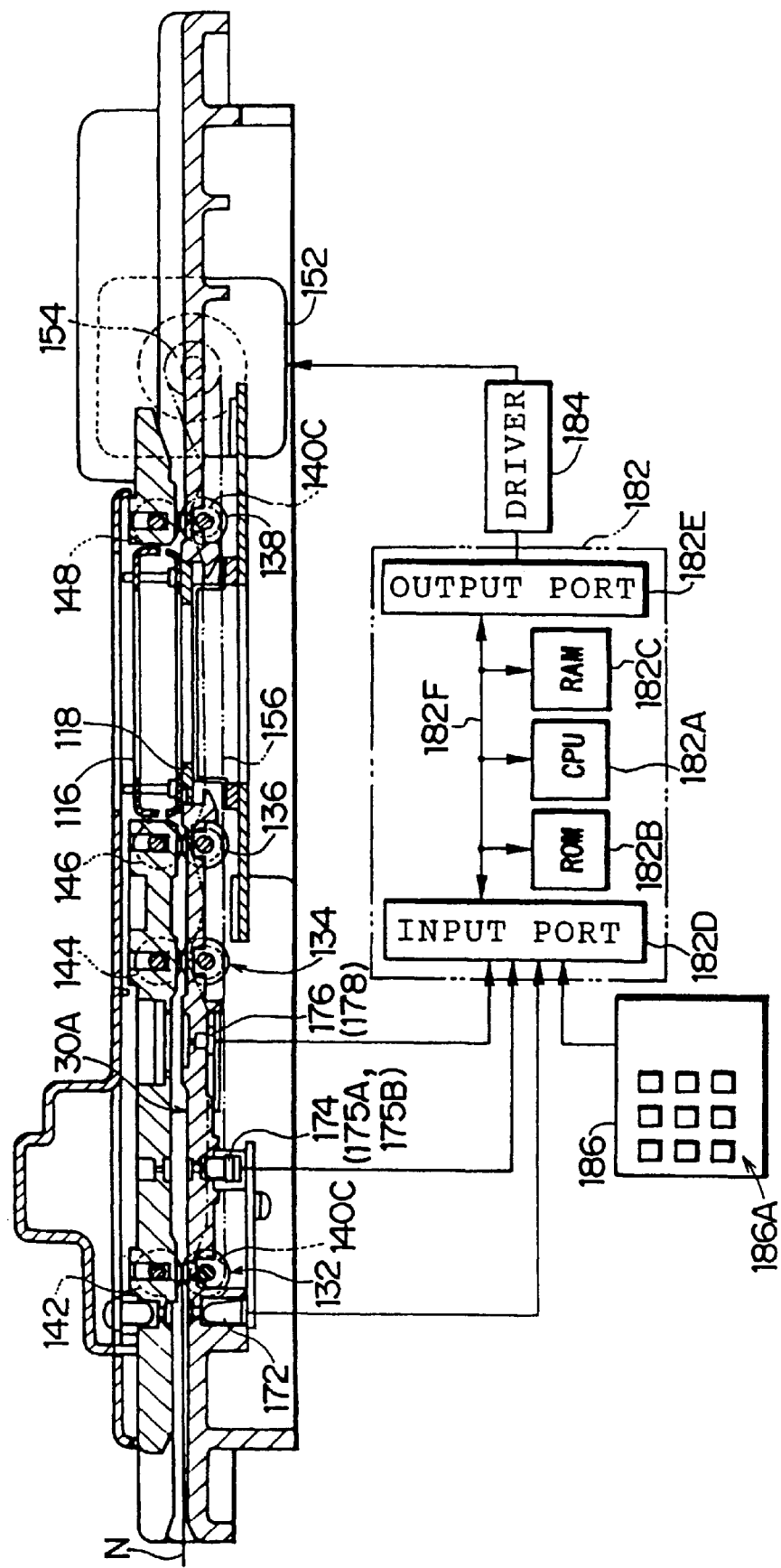
FIG. 4 is a schematic view showing a section of the negative carrier along line IV—IV of FIG. 3 and a schematic construction of a controller.

Referring next to the negative carrier 30, a cover 112 closable against a base 31 is mounted, as shown in FIG. 3 and FIG. 4, on the negative carrier 30. A negative film passage 30A is formed on the base 31, and a mask (also called an under negative mask) 118 is mounted near the central portion (exposure position) of the negative film passage 30A corresponding to a rectangular through hole.

On the other hand, a holder 114 which can be mounted rotatably against the base 31 like the cover 112 is provided in the vicinity of the rotating axis of the cover 112, and a compression plate (also called an upper-negative mask) 116 is installed thereto. A window 119A and another window 119B corresponding to the image frames are formed on the mask 118 and the compression plate 116 respectively. The exposing light is irradiated onto the masks 116, 118 and passed through the window 119A and the window 119B.

The upper negative mask 116 is mounted with a clearance wide enough to allow the negative film N to be transported to the under negative mask 118 when the cover 112 is closed. When the solenoid 117 is electrified under those conditions, the upper negative mask 116 is moved in the direction approaching the under negative mask 118 by the magnetic force of the solenoid 117, thus holding the negative film N at a predetermined pressure.

Three rotating driving rollers 132, 134, 136 are mounted upstream from the mask 118, with respect to the direction in which the film is transported, in the negative film passage 30A. Further, a rotating driving roller 138 is mounted downstream of the mask 118 in the direction in which the negative film is transported. As shown in FIG. 4, the negative carrier 30 incorporates therein a motor 152 comprising a pulse motor, and a timing belt 156 is wound on the drive shaft of the motor 152 through a pulley 154. The timing belt 156 is also wound on a pulley 140C mounted on the driving rollers 132, 134, 136, 138, and the construction is such that the driving rollers 132, 134, 136, 138 are rotated by the driving force of the motor 152.

Rotatable slave rollers 142, 144, 146, 148 are mounted on the cover 112 so as to correspond to the driving rollers 132, 134, 136 and 138. When the cover 112 is closed, the negative film N is held between the driving rollers 132, 134, 136, 138 and the slave rollers 142, 144, 146, 148 respectively, and, as a result, is transported along the negative film passage 30A.

As shown in FIG. 3, a light-sensor 172 for detecting the leading edge and the rear edge of the negative film N, is mounted upstream, in relation to the direction in which the film is being transported of the driving roller 132, on the negative film passage 30A. Also, a splice sensor 174 is mounted between driving rollers 132 and 134, for detecting the splicing tape used when multiple lengths of the negative film N are connected lengthwise to make a single length of film. An FNS code sensor 175A as well as a DX code sensor 175B are also mounted in adjacent positions to the left and right of the splice sensor 174, perpendicular to the direction in which the film is being transported, as a first means of mark detection. An image detecting sensor 176 is mounted downstream, in relation to the direction in which the film is being transported, of the splice sensor 174, as an image detecting means. In a position adjacent to the image detecting sensor 176, perpendicular to the direction in which the film is being transported, and also in a position where the perforations prepared on the negative film N pass over it every time the film is transported, is mounted a perforation sensor 178 as a means of mark detection.

These sensors 172, 174, 175A, 175B, 176, 178 are each connected each to a controller 182 as a control means along with the motor 152. The controller 182 is equipped with CPU 182A, ROM 182B, RAM 182C, input port 182D and output port 182E, which are connected with each other by way of a bus 182F. The sensors 172, 174, 175A, 175B, 176, 178 are connected to the input port 182D, and the motor 152 is connected to the output port 182E by way of a driver 184. Further, a keyboard 186 for operators to give various instructions therethrough is connected to the input port 182D. The keyboard 186 is provided with a numeric keypad 186A as well as other keys for operators to input various numeric data therethrough.

Next, the overall process flow of the printer processor 10 will be described first as an operation according to this embodiment. When the negative film N is set on the negative carrier 30, the negative film N is transported forward, and the position of each image recorded on the negative film N is stored on the basis of the position of perforations, (which will be described in further detail later).

The negative film N is then transported backward, and when the image recorded on the negative film N according to the position of each image stored during the forward transportation, is placed in the exposure position, (which will be described in detail later), the exposing light from the light source device 96 is radiated on the image placed in position as described above, and the light transmitted through the image is radiated on the photographic printing paper P placed in position beforehand on the pedestal 46, thus printing the image on the photographic printing paper P. When the printing is over, the negative film N is transported forward by one frame at the same time as the next photographic printing paper P is placed in position on the pedestal 46, thus repeating the printing process.

The printed and exposed photographic printing paper P is delivered into the processor 72 by way of a passage 60. It is firstly transported to inside a color developing tank 74 in a U-shaped motion to undergo the color developing process. It is then transported to inside a bleach fixing tank 76 and a washing tank 78 also in a U-shaped motion to undergo the bleach fixing process and the washing process. It is thence carried to the dryer unit 80. The photographic printing paper P coming out of the dryer unit 80 is held between multiple pair of rollers to be discharged externally of the printer processor 10 and then piled up.

Next in reference to flowcharts of FIG. 5 and FIG. 6, forwards and backwards transportation control and the printing process of the negative film N by the controller 182 will be described in detail. In STEP 200 is decided whether or not the negative film N has been set on the negative carrier 30. The decision of STEP 200 is affirmed when the negative film N is inserted into the negative film carrier unit 30A of the negative carrier 30, and after the leading edge of the negative film N is detected by the lightsensor 172, the motor 152 is driven slightly, and thus the leading end of the negative film N comes to be held between the driving roller 132 and the slave roller 142. When the decision of STEP 200 is affirmed, STEP 202 follows.

In the next STEP 202, the motor 152 is kept driven and the negative film N forward transportation is started. When the negative film N is thus started to move forward, a negative film rear edge detecting process is carried out periodically at every predetermined time and a perforation detecting process is started concurrently in parallel with the process indicated in FIG. 5.

The negative film rear edge detecting process is completed by setting "1" to a film rear edge flag when the rear edge of the negative film N is detected by the FNS code sensor 175A and the DX code sensor 175B.

The perforation detecting process then comprises counting the pulse number of a driving signal for driving the motor 152 on a pulse counter which is not indicated. Then, a change in the light transmission factor of the portion where perforations of the negative film N are punched is monitored by the perforation sensor 178, and whenever an edge of the perforation on the front side in the direction toward which the film is being transported is detected (i.e. whenever the light transmission factor suddenly increases), namely, through interrupt processing every time an output signal is emitted by the perforation sensor, a perforation counter which is not indicated is counted up, at the same time a value counted on a pulse counter which is not indicated is reset, and repeated counting of the pulse number of the driving signal is commenced again by means of a pulse counter.

On the other hand, when the negative film N is started to be transported forward, a detection of the front edge of the image by the image detection sensor 176 is awaited in STEP 204. In the negative film, generally the density of the portion where the image is exposed and recorded becomes obviously higher than the density of unexposed portions (transparent portion at edges of frame), therefore the portion whereat the density of the negative film N which is detected by the image detecting sensor 176 gets sharply high can be detected as the front edge of the image.

When the front edge of the image is detected, whether or not the negative film N is transported by a fixed amount (transportation amount for placing the image with the front edge positioned at the portion where the image detecting sensor 176 is mounted in exposure position) after the edge of the image has been detected is decided in STEP 206.

When the film is transported by the fixed amount after the front edge of the image has been detected, it is decided that the image has arrived at the exposure position, and in STEP 208, the number of perforations from the front of the negative film N which is counted by the perforation counter and the pulse number of the driving signals are taken in, and the taken-in data is stored in a predetermined area of the RAM 182C as an image position at this point in time (position of the negative film).

If the image position taken on the basis of the perforation position has been stored, then the process shifts over to STEP 210, in which whether or not the film rear edge flag has been turned on (set to "1") according to the negative film rear edge detecting process described hereinbefore is decided, and if not turned on, the process returns to STEP 204, but if turned on, then the process shifts over to STEP 212. Consequently, the position of each image on the negative film N according to STEP 204 to STEP 208 is stored repeatedly until the film rear edge flag is turned on. In this case, the stored image position of each image stored then is stored successively in a predetermined area of the RAM 182C in the ascending order of record of the negative film N. Accordingly, when referring to the position of the image detected first for example, the value of the leading address in a predetermined area of the RAM 182C may be referred to, and where the position of the image detected second is referred to, the value of the address next to the leading address in the predetermined area of the RAM 182C may be referred to.

Figure 6:
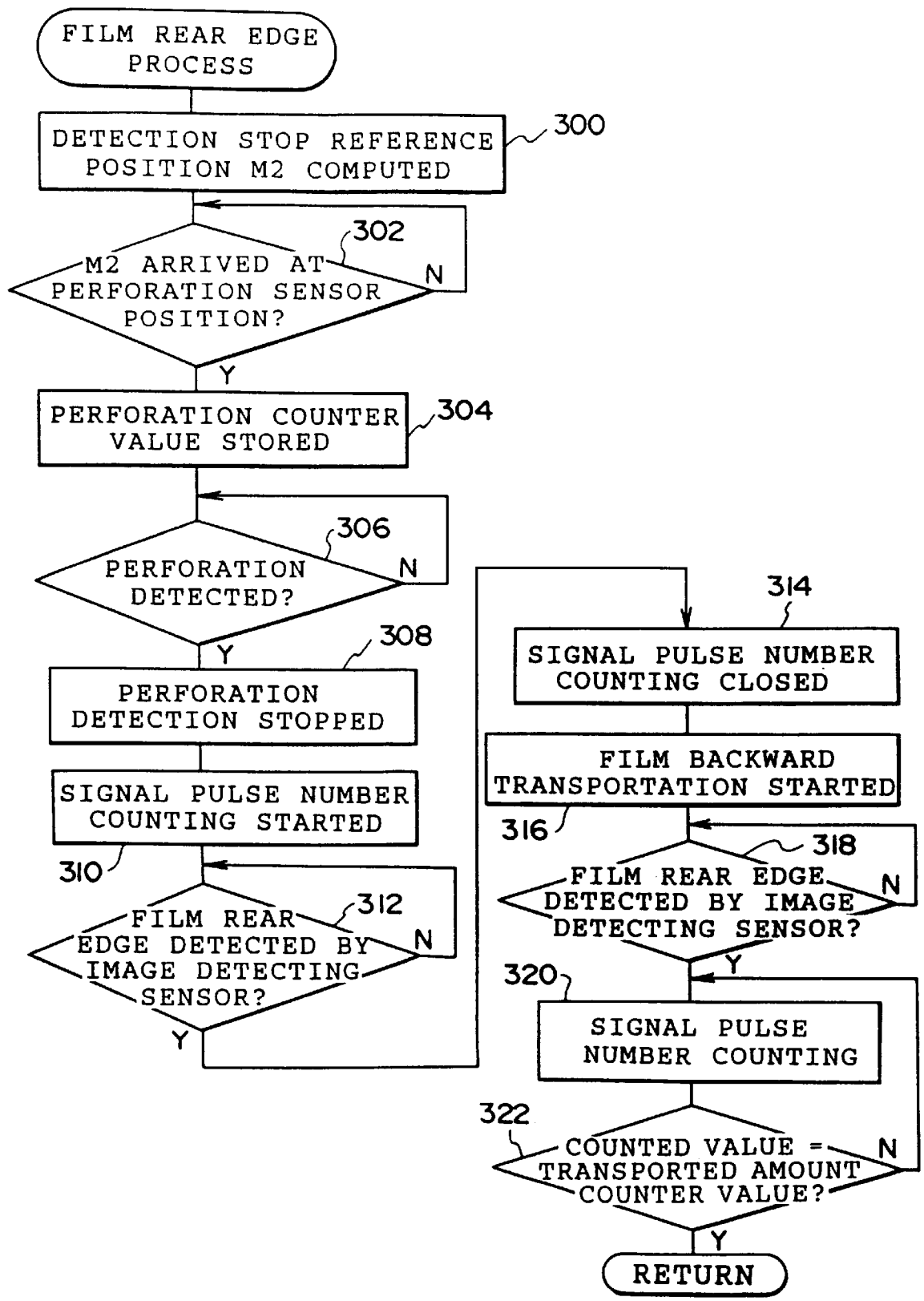
FIG. 6 is a flowchart illustrating the film rear edge processing in the flowchart of FIG. 5.
Figure 7:
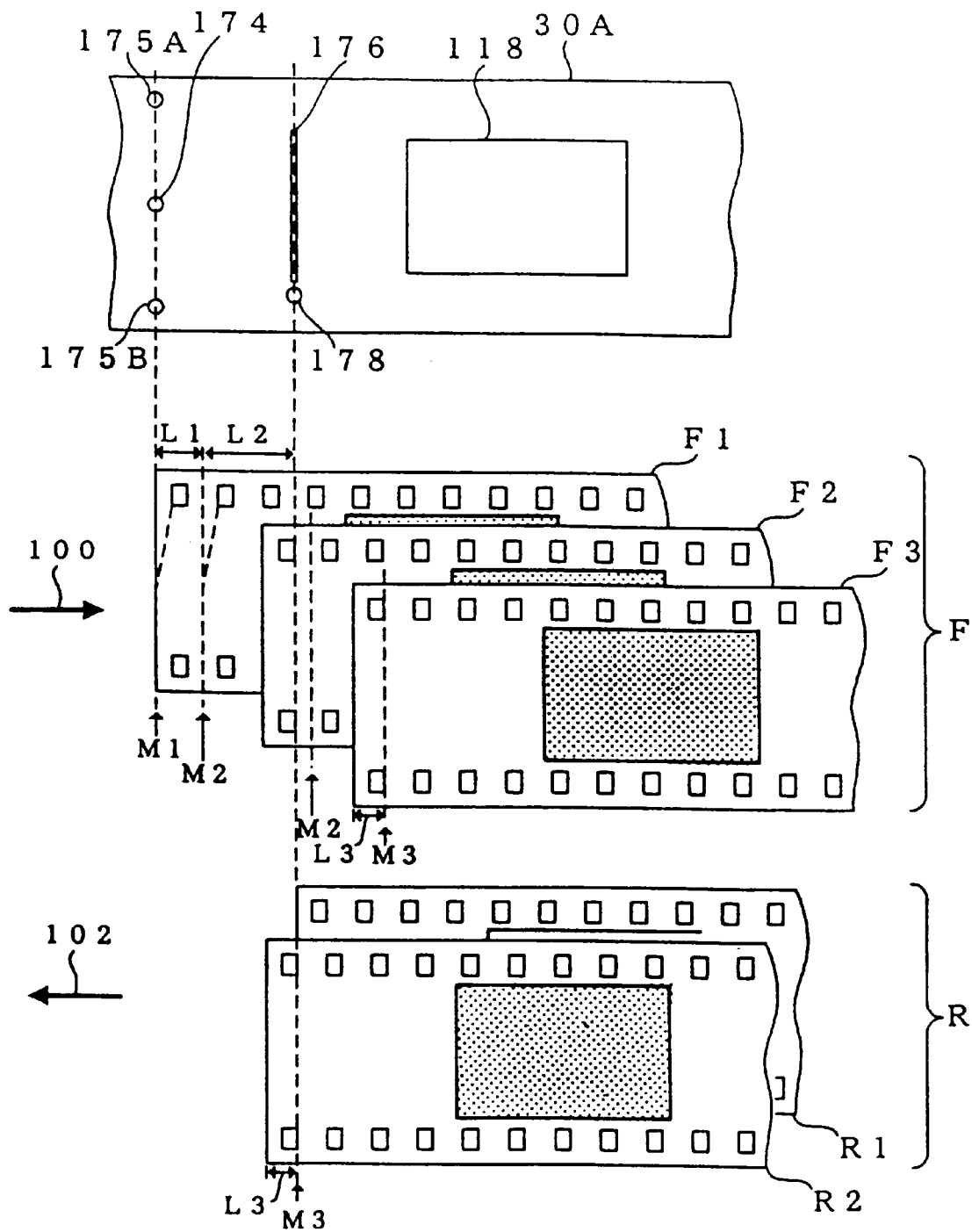
FIG. 7 is a schematic view showing the relative positions of each sensor and film at the time of each processing operation in the film rear edge processing.
Figure 8A:
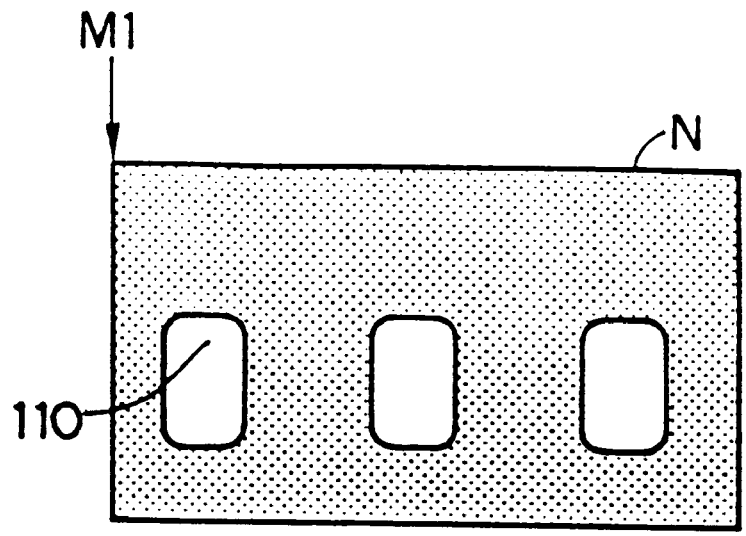
FIGS. 8A and 8B are schematic views showing the shapes of the perforations at the film rear edge.
Figure 8B:
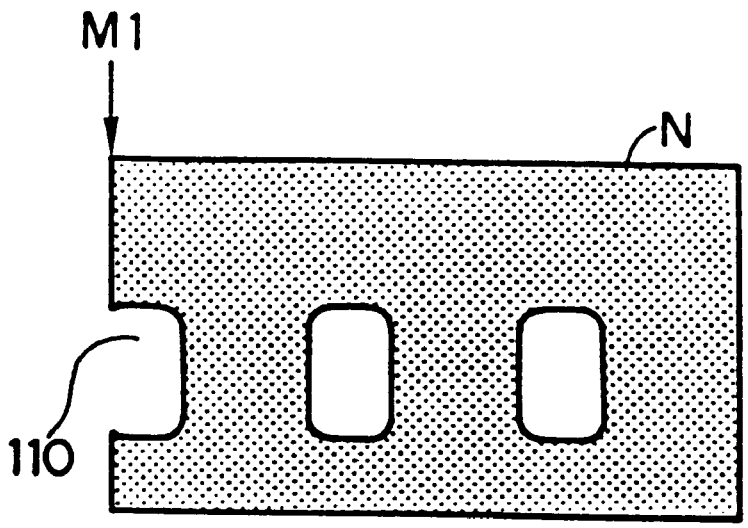

In the next STEP 212, a film rear edge process routine shown in FIG. 6 is executed. Next, in referring to FIG. 6 and FIG. 7, the film rear edge process will be described in detail. FIG. 7 is a schematic illustration indicating the relation between the position of each sensor in the negative film passage 30A and each position of the negative film N moving forward and backward in turn at the time of film rear edge processing, wherein a reference character F denotes a moving position (3 spots F1, F2 and F3) of the negative film according to the lapse of time when transported forward, and R denotes a moving position (2 spots R1 and R2) of the negative film according to the lapse of time when transported backward. Further, an arrow 100 indicates the direction where the negative film N is transported forward, and an arrow 102 indicates the direction when the negative film N is transported backward.

In STEP 300 of FIG. 6, a stop reference position M2 (FIG. 7) of the perforation detecting process is computed. The stop reference position M2 in this case, refers to a position going back L1 a length of a pitch between the marks (hereafter referred to as a unit length), from the rear edge of the negative film, M1. L2 is computed as the distance from the point when the rear edge M1 of the negative film N is detected by the FNS code sensor 175A and by the DX code 175B (as shown in F1 of FIG. 7), until the stop reference position M2 reaches the perforation sensor 178 detection position. The distance of L2 is obtained by subtracting the unit length L1 from the distance between the perforation sensor 178 and the two code sensors. In this case, the length L2 is obtainable by subtracting the unit length L1 from the length between the perforation sensor 178 and each code sensor.

In the next STEP 302, the arrival of the stop reference position M2 at the perforation sensor 178 detection position is awaited. This process can be realized by waiting for the lapse of time for transporting the negative film by the length L2 from the point in time when the film rear end M1 is detected by each code sensor.

When the stop reference position M2 arrives at the perforation sensor 178 detection position, the value of the perforation counter at this point in time is stored in a predetermined area of the RAM 182C in STEP 304. In this case, the perforation corresponding to the count value of the perforation counter which is stored as above, is that coming second from the negative film rear edge, and which functions as a reference perforation for matching to be taken during the backwards transportation.

In the next STEP 306, detection by the perforation sensor 178 of the front edge of the perforation according to the direction toward which the film is carried is awaited, and at the point in time (F2 status of FIG. 7) when the edge is detected the decision is affirmed to shift over to STEP 308, thus stopping the operation for detecting the perforation from position M3.

When the operation for detecting the perforation is stopped, in STEP 310, the pulse counter which is not indicated is reset, counting of the pulse number of the motor driving signal is started again to shift then over to STEP 312, detection of the rear edge of the negative film N by the image detecting sensor 176 is awaited, and after the rear edge is detected the process shifts over to STEP 314, where counting of the pulse numbers of the motor driving signal started in STEP 310 is terminated. Consequently, the count value of the pulse counter at the point in time when STEP 314 is terminated, indicates the pulse number of the motor driving signal when the negative film N is transported by a length L3, which is only from covering the position M3, whereat the detection of perforation is stopped, to the rear end M1 of the negative film N.

In the next STEP 316, after the negative film N has been transported for a standard distance (F1 status of FIG. 7), the backward transportation of the negative film N is started, and in the next STEP 318, detection of the rear edge M1 of the negative film N by the image detecting sensor 176 is awaited.

When the rear edge M1 of the negative film N is detected (R1 status of FIG. 7), the pulse number of the motor driving signal is counted in STEP 320, and in the next STEP 322, whether or not the value counted in STEP 320 reaches the value of the pulse counter counted in the processes of STEP 310 to STEP 314 is decided, and if not, the process returns to STEP 320, where counting of the pulse numbers of the motor driving signal is carried out continuously, and the film rear edge process routine is terminated at the point in time when the required value is reached (R2 status of FIG. 7). In other words, after waiting for the position M3 to reach the detection position by the perforation sensor 178, the film rear edge process routine is brought to an end by the process of steps 320 and 322.

According to the film rear edge process described above, detection of the perforation will not be effected from the position M3 to the negative film rear edge during forward transportation, nor from the negative film rear edge to the position M3 during backward transportation. Further, the image detecting sensor 176, which performs film rear edge detection as described in the film rear edge processes of steps 312 and 318, corresponds to the second rear edge detection means of the present invention.

On the other hand, the second perforation detecting process is started just as the film rear edge process routine is brought to an end.

The second perforation detecting process comprises setting the value of the perforation counter stored in STEP 304 to the perforation counter beforehand, and counting down the perforation counter by 1 whenever the rear edge of the perforation, according to the direction in which the film is transported backward, is detected by the perforation sensor 178 namely, by interrupt processing each time an output signal from perforation sensor 178 is emitted (or whenever the light transmission factor is suddenly decreased). In addition, the pulse number of the motor driving signal, required for transporting the negative film N by the unit length L1, is set to the pulse counter at the same time, and the pulse counter is counted down whenever a pulse of the motor driving signal is output. Thus, by operating both the perforation counter and the pulse counter and by referring to both the perforation counter and the pulse counter values, the transported position of negative film N at the time of the referring can be set as a numerical value in the same way as the position of each image stored in step 208 during the forward transportation.

Figure 5:
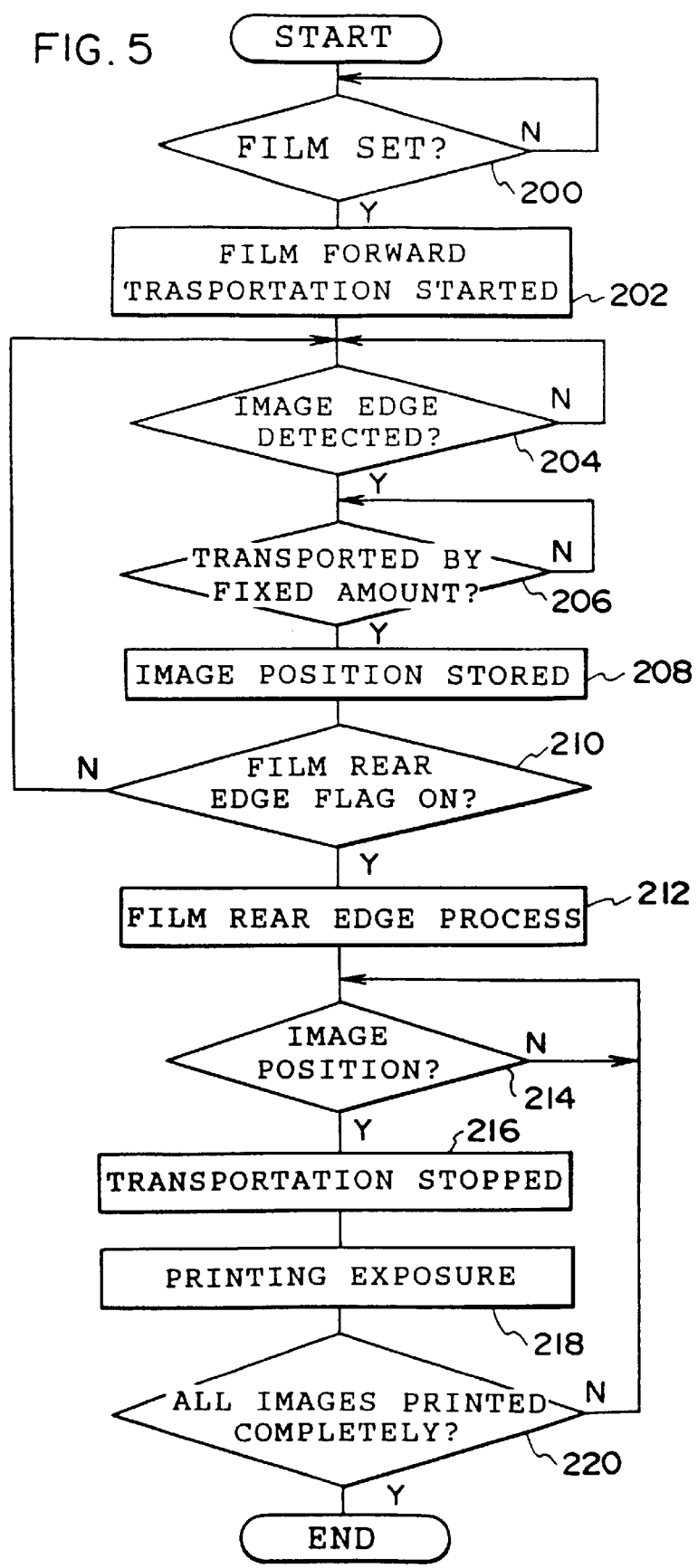
FIG. 5 is a flowchart illustrating a transportation control and a printing process of a negative film relating to the mode of operation of the present invention.

When the film rear edge process routine is terminated and thence the second perforation detecting process is started, in STEP 214 of FIG. 5, whether or not the last image in the negative film N (the image transported first during the backward transportation) has arrived at the exposure position is decided in accordance with the number of perforations from the front of the negative film N and the pulse number of the driving signal, indicating the position of each image, stored during the forward transportation in STEP 208, and the value of both the perforation counter and the pulse counter obtained from the second perforation detecting process. In this case, by referring to the values of the perforation counter which are so counted in the second perforation detecting process as well as of the pulse counter, whether or not each value is equal to the perforation number and the pulse number corresponding to the position of the last image stored during the forward transportation is decided, and if so, then the decision of STEP 214, that the last image has arrived at the exposure position is affirmed, and the process is shifted to STEP 216 to stop transportation of the negative film N.

When transportation of the negative film N is stopped, the process is shifted to STEP 218, where printing exposure is carried out. That is to say, after shifting the position of each filter of the light controlling filter unit 24 according to predetermined exposure conditions, the black shutter 41 is opened for exposure time corresponding to the above-mentioned exposure conditions, and the exposing light radiated from the exposure lamp 25 and transmitted through the light controlling filter unit 24 and the negative film N in sequence is printed onto photographic paper.

When the printing exposure process is over, the process is shifted to STEP 220, in which whether or not the positioning and printing exposure processes of the image of STEPs 214 to 218 are finished for all images detected during forward transportation is decided, and if not, then the process returns to STEP 214 to carry out the positioning and printing exposure processes of the remaining images repeatedly. After all the images have been duly processed, the forwards and backwards transportation control and the printing process are terminated.

As described above, according to this embodiment, the perforation at the rear edge of the negative film N is not detected during either forward or backward transportation, but the perforation second from the rear edge of the negative film N is detected and match taken. Therefore perforations can be prevented from being mismatched due to any difference in shape of the perforation at the rear edge of the negative film N. Moreover, the second rear edge detecting means of the invention is realized by using an existing image detecting sensor, therefore no cost of parts for setting up the second rear edge detecting means is necessary.

Further, in this embodiment, the description has ref erred to the case where only the position of each image is stored during the forward transportation, however, the present invention is not necessarily limited thereto. For example, in addition to the image position of each image, the exposure conditions, obtained from the density measuring apparatus 40, may be obtained and stored, and these exposure conditions, referred to during the backwards transportation, may be used to configure the printing exposure.

Still further, in this embodiment, the description has also referred to the case where the perforation second from the rear edge of the negative film is used for matching perforations during forwards and backwards transportation, however, the invention is also not limited thereto. A perforation other than that at the rear edge of the negative film, which can be detected by the perforation sensor after the image on the rear edge of the negative film is placed in exposure position during forward transportation is acceptable for matching. For example, in the case where a matching is taken using the perforation coming third from the rear edge of the negative film N. A position twice the unit length from the rear edge of the negative film N may be taken as the perforation detection stop reference position in STEP 300.

During forward transportation, a detection of the mark is not performed from a reference portion on the film removed from the film rear edge by a distance longer than one mark in length to the rear edge thereof, and when transported backward, mark detection is started from the reference portion on the film, therefore the marks detected during backward transportation can be matched with certainty with the marks detected during backward transportation irrespective of the shape of the mark on the rear edge of the film, thus ensuring the image recorded on the film may be accurately placed in a predetermined position.

Further, the invention is also effective in that the timing, whereat the rear edge of the film during backward transportation (or the leading edge of the film during backward transportation) has reached the position of the mark detecting means can be detected with certainty by using two rear edge detecting means and mounting the one rear edge detecting means in substantially the same position as the mark detecting means. Therefore even in cases where a transportation error such as the film rear edge (or the film leading edge when transported backward being caught up), or the like arises from the time when the film is started to be transported to the time when the reference portion on the film reaches the position of the mark detecting means, matching of the mark detected during forward transportation with the mark detected during backward transportation can be made with certainty, thus placing the image recorded on the film with certainty in a predetermined position.

What is claimed is:

1. A film transporting apparatus for transporting forwards and backwards a film with a plurality of images recorded thereon in a predetermined direction, whereby a position of each image is stored and placed in a predetermined position on a basis of a position of a multiplicity of position differentiating marks provided on the film in the predetermined direction at regular pitches, comprising:

a mark detecting means for detecting the marks on the film;

a image detecting means for detecting the images on the film;

a rear edge detecting means for detecting a rear edge of the film; and a control means for controlling said mark detecting means so as not to detect the marks from the rear edge of the film to a reference portion on the film during forward transportation of the film.

2. A film transporting apparatus according to claim 1, wherein said rear edge detecting means comprises:

a first rear edge detecting means for detecting the rear edge of the film during forward transportation of the film, and a second rear edge detecting means for detecting the rear edge of the film during backward transportation of the film.

3. A film transporting apparatus according to claim 2, wherein said first rear edge detecting means is mounted upstream of said mark detecting means in a direction in which the film is transported forward.

4. A film transporting apparatus according to claim 2, wherein said second rear edge detecting means is mounted in an adjacent position to said mark detecting means to a film widthwise direction.

5. A film transporting apparatus according to claim 4, wherein said second rear edge detecting means is said image detecting means.

6. A film transporting apparatus according to claim 1, wherein said rear edge detecting means is mounted so as to detect an area around a widthedge of the film and an area around a midpoint of the film to a film widthwise direction.

7. A film transporting apparatus according to claim 6, wherein the area around the widthedge of the film is between the widthedge of the film and the marks on the film, and the area around the midpoint of the film is a wider section than a width of the image on the film to the film widthwise direction.

8. A film transporting apparatus according to claim 6, wherein the rear edge detecting means mounted so as to detect the area around the midpoint of the film is said image detecting means.

9. A film transporting apparatus according to claim 1, wherein the marks are perforations.

10. A film transporting apparatus according to claim 1, wherein a length between the rear edge of the film and the reference portion on the film is longer than one of said marks in length.

11. A film transporting apparatus according to claim 10, wherein the length longer than one of said marks in length is one of the regular pitches between the marks.

12. A film transporting apparatus according to claim 11, wherein the marks are perforations.

13. A film transporting apparatus for transporting forwards and backwards a film with a plurality of images recorded thereon in a predetermined direction, whereby a position of each image is stored and placed in a predetermined position on a basis of a position of a multiplicity of position differentiating marks provided on the film in the predetermined direction at regular pitches, comprising:

a mark detecting means for detecting the marks on the film;

a image detecting means for detecting the images on the film;

a rear edge detecting means for detecting a rear edge of the film; and a control means for controlling said mark detecting means so as not to detect marks from the rear edge of the film to a reference portion during forward transportation of the film, said reference portion being located at a length, from the rear edge of the film, which length is longer than one of said marks in length, according to a detection result taken by said rear edge detecting means.

14. A film transporting apparatus according to claim 13, wherein said rear edge detecting means comprises:

a first rear edge detecting means for detecting the rear edge of the film during forward transportation of the film; and a second rear edge detecting means for detecting the rear edge of the film during backward transportation of the film.

15. A film transporting apparatus according to claim 14, wherein said first rear edge detecting means is mounted upstream of said mark detecting means in a direction in which the film is transported forward.

16. A film transporting apparatus according to claim 14, wherein said second rear edge detecting means is mounted in an adjacent position to said mark detecting means to a film widthwise direction.

17. A film transporting apparatus according to claim 16, wherein said second rear edge detecting means is said image detecting means.

18. A film transporting apparatus for transporting forwards and backwards a film with a plurality of images recorded thereon in a predetermined direction, whereby a position of each image is stored and placed in a predetermined position on a basis of a position of a multiplicity of position differentiating marks provided on the film in the predetermined direction at regular pitches, comprising:

a mark detecting means for detecting the marks on the film;

a image detecting means for detecting the images on the film;

a first rear edge detecting means for detecting a rear edge of the film being mounted upstream of said mark detecting means in the direction in which the film is transported forward;

a second rear edge detecting means for detecting a rear edge of the film being mounted in an adjacent position to a film widthwise direction to said mark detecting means; and a control means for controlling said mark detecting means so as not to detect the marks based on a result of a first rear edge detection by said first rear edge detecting means during forward transportation of the film, from a time when a reference portion on the film passes over said mark detecting means to a time when the rear edge of the film passes over said mark detecting means, and not to detect the marks, based on a result of a second rear edge detection by said second rear edge detecting means during backwards transportation of the film, from a time when the rear edge of the film passes over said second rear edge detecting means to a time when the reference portion on the film passes over said mark detecting means.

19. A film transporting apparatus according to claim 18, wherein said second rear edge detecting means is said image detecting means.

20. A film transporting apparatus according to claim 18, wherein the marks are perforations.

21. A film transporting apparatus for transporting forwards and backwards a film with a plurality of images recorded thereon in a predetermined direction, whereby a position of each image is stored and placed in a predetermined position on a basis of a position of a multiplicity of position differentiating marks provided on the film in the predetermined direction at regular pitches, comprising:

a plurality of mark detecting sensors for detecting the marks on the film;

an image detecting sensor for detecting the images on the film;

a plurality of rear edge detecting sensors for detecting a rear edge of the film; and a controller for controlling said plurality of mark detecting sensors so as not to detect the marks from the rear edge of the film to a reference portion on the film during forward transportation of the film.

* * * * *